United States Patent
Creath

(10) Patent No.: US 9,691,189 B1
(45) Date of Patent: Jun. 27, 2017

(54) ACCIDENT ASSESSMENT AND RECONSTRUCTION SYSTEMS AND APPLICATIONS

(75) Inventor: Jacquelyn D Creath, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 13/327,731

(22) Filed: Dec. 15, 2011

Related U.S. Application Data

(63) Continuation-in-part of application No. 12/240,370, filed on Sep. 29, 2008.

(60) Provisional application No. 61/423,471, filed on Dec. 15, 2010.

(51) Int. Cl.
G09G 5/00 (2006.01)
G07C 5/00 (2006.01)
G07C 1/00 (2006.01)
G06T 11/00 (2006.01)

(52) U.S. Cl.
CPC ............. *G07C 1/00* (2013.01); *G06T 11/00* (2013.01)

(58) Field of Classification Search
CPC ......... G06T 11/60; G06T 19/00; G06T 11/00; G06F 9/4443; G06F 3/0481
See application file for complete search history.

(56) References Cited

U.S. PATENT DOCUMENTS

| | | | |
|---|---|---|---|
| 5,628,033 A * | 5/1997 | Dilich et al. ................. 396/7 |
| 6,246,933 B1 * | 6/2001 | Bague .............. G07C 5/085 340/438 |
| 8,121,753 B2 * | 2/2012 | Bauchot ............. G06Q 10/00 701/32.2 |
| 2002/0055861 A1 * | 5/2002 | King et al. ................... 705/4 |
| 2002/0145666 A1 * | 10/2002 | Scaman et al. .......... 348/148 |
| 2003/0011592 A1 * | 1/2003 | Southwell et al. ....... 345/420 |
| 2003/0046003 A1 * | 3/2003 | Smith et al. .............. 701/213 |
| 2003/0212567 A1 * | 11/2003 | Shintani et al. ............. 705/1 |
| 2005/0052462 A1 * | 3/2005 | Sakamoto et al. ....... 345/473 |
| 2005/0283285 A1 * | 12/2005 | Ying .......................... 701/29 |
| 2006/0208169 A1 * | 9/2006 | Breed et al. .............. 250/221 |
| 2007/0288135 A1 * | 12/2007 | Kidd et al. ................. 701/29 |
| 2008/0052134 A1 * | 2/2008 | Nowak et al. ............... 705/4 |
| 2008/0316053 A1 * | 12/2008 | Boss et al. ................ 340/902 |
| 2009/0138290 A1 * | 5/2009 | Holden ......................... 705/4 |
| 2010/0029293 A1 * | 2/2010 | Bergh et al. ............ 455/456.1 |

FOREIGN PATENT DOCUMENTS

JP 08007197 * 1/1996

* cited by examiner

*Primary Examiner* — Ryan R Yang
(74) *Attorney, Agent, or Firm* — Baker & Hostetler LLP

(57) ABSTRACT

Accident assessment and reconstruction systems and applications are described. A computer system and software application to reconstruct the scene of an automobile accident by rendering two-dimensional or three-dimensional visual perspectives of an accident. Furthermore, a computer system and software application to assess damage to a vehicle following an accident by rendering a three-dimensional perspective of a vehicle. The three-dimensional perspective of a vehicle illustrates the severity of damage to the vehicle. The rendered visual perspectives create more realistic and detailed documentation of an accident may be useful in accident reporting and insurance claim reporting.

13 Claims, 18 Drawing Sheets

ACCIDENT ASSESSMENT AND RECONSTRUCTION SYSTEMS AND APPLICATIONS

CLAIM OF PRIORITY

This application is a continuation-in-part of and claims the benefit of priority under 35 U.S.C. §120 of U.S. patent application Ser. No. 12/240,370, filed on Sep. 29, 2008, and which is incorporated by reference herein in its entirety. This application also claims the benefit of priority under 35 U.S.C. §119(e) of U.S. Provisional Patent Application Ser. No. 61/423,471, filed on Dec. 15, 2010, and which is incorporated by reference herein in its entirety.

TECHNICAL FIELD

The present disclosure relates generally to computer systems, and more particularly, to systems and applications used to reconstruct the scene of an accident and assess subsequent vehicle damage.

BACKGROUND

Evaluating the scene of an accident is performed for a number of reasons. Primarily, accurate information is needed to properly fill out accident reports and initiate insurance claims. Additionally, an accurate assessment of damage to a vehicle is necessary to properly estimate the cost and time needed to complete a vehicle repair. Current methods of evaluating an accident scene can lead to incomplete or inaccurate reporting. One possible consequence arising from incomplete or inaccurate reporting is lengthy and costly dispute resolution. Moreover, inaccurate reporting of damage to a vehicle can lead to unrealistic damage estimates, thus creating an added cost to insurance companies and their insured members.

In many cases, a rough sketch or drawing is created to illustrate the occurrence of an accident. The rough sketch or drawing may be incorporated into reporting tools such as police reports or loss reports for insurance claims. This method of reporting is limiting as it lacks the ability to provide a realistic perspective of the accident and the damage caused to a vehicle. Furthermore, such rough sketches or drawings are not always created immediately after an accident. It may be many days before a report is created. This may lead to further report inaccuracies. Often times, third-parties such as police officers, insurance representatives, emergency medical technicians, or accident witnesses, are not at the scene of an accident when it occurs. Those third-parties are forced to rely on the report containing a rough sketch or drawing to visualize the accident occurrence.

For these and other reasons there is a need for the present disclosure.

SUMMARY

The present disclosure solves the aforementioned problems by creating virtual, computer-generated visual perspectives of both an accident scene and subsequent damage to a vehicle. These visual perspectives provide a more realistic visual depiction of how an accident occurred as well as the severity of the damage caused to a vehicle. The inventive concepts described in this disclosure may be applied to areas such as accident reporting, insurance claim reporting, vehicle damage assessments, litigation, alternative dispute resolution, and the like.

The concept of augmented reality is applied to a computer system, and applications with computer executable instructions operable on a computer system. The computer executable instructions may provide a graphical user interface allowing a user to interact with an application to create an animated visual perspective of an accident scene. According to the disclosure, a computer system may be a mobile device having a processor or microprocessor which may be used at the scene of an accident. Additionally, a visual perspective may be created to assess damage to a vehicle. A visual perspective may be three-dimensional.

Furthermore, the computer system and software applications may interact with an insurance claim system. The insurance claim system may be used to initiate an insurance claim arising from an accident. The computer system and applications described in the disclosure may also interact with external resources. External resources may be any physical or virtual component which may communicate with the computer system and software applications.

BRIEF DESCRIPTION OF THE DRAWINGS

Various embodiments will now be described in detail with reference to the accompanying drawings, in which.

DETAILED DESCRIPTION

The following detailed description is divided into four sections. The first section presents a system overview. The second section provides methods of using example embodiments. The third section describes example implementations. The fourth section describes the hardware and the operating environment in conjunction with which embodiments may be practiced.

System Level Overview

Figure 1:
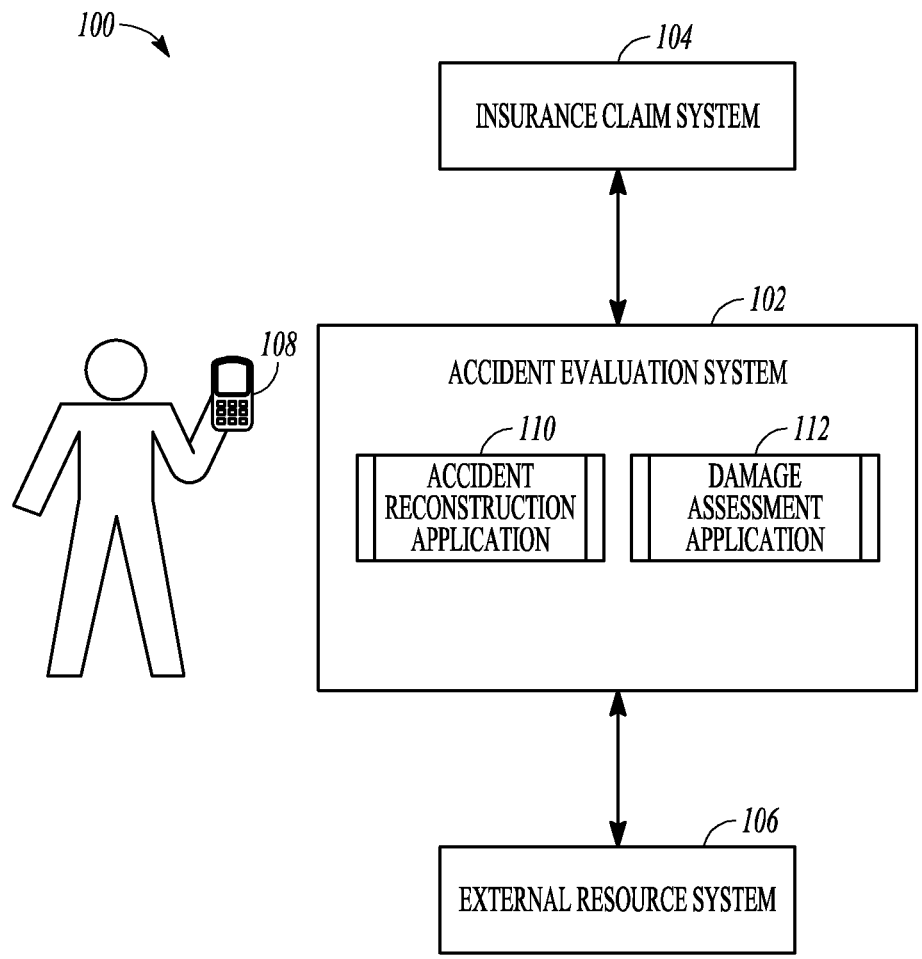
FIG. 1 is a block diagram illustrating a general overview of an accident assessment and reconstruction system according to an example embodiment.

FIG. 1 comprises a block diagram illustrating a general overview of an accident assessment and reconstruction system 100. Generally, the accident assessment and reconstruction system 100 may be used to initiate an insurance claim following an accident. The accident assessment and reconstruction system 100 comprises an accident evaluation system 102, an insurance claim system 104, an external resource system 106, and a computer system 108.

The accident evaluation system 102 communicates with a computer system 108 controlled by a user. In one embodiment, the accident evaluation system 102 comprises computer readable instructions to execute on the computer system 108, which allows a user to utilize an accident reconstruction application 110 and a damage assessment application 112. The accident evaluation system 102 provides a graphical user interface so a user can interact with the accident reconstruction application 110 and the damage assessment application 112. The user can interact with these applications individually, or in combination, to facilitate faster claim processing. Furthermore, the accident evaluation system 102 may communicate with an insurance claim system 104 to initiate an insurance claim and transmit data to an insurance provider. The accident evaluation system 102 may also communicate with an external resource system 106 to enhance the capability of both the accident reconstruction application 110 and the damage assessment application 112.

In one embodiment, the accident reconstruction application 110 allows the user to reconstruct a virtual visual perspective that accurately portrays the event of an accident. In one embodiment, the accident reconstruction application 110 receives input from the computer system 108 and the external resource system 106, mutually or exclusively. The external resource system 106 may be any physical or virtual component which can be used by the computer system 108 or accident evaluation system 102 to improve the capabilities of the accident assessment and reconstruction system 100. The external resource system 106 may be comprised of hardware, software, or the Internet. The computer system 108 may transit input data captured by a device linked to the computer system 108. One example of a device linked to the computer system 108 may be a recording or tracking device to capture motion and convert it to input data. One example of an external resource may be satellite imagery providing location specific data to the accident reconstruction application 110. This can provide a more realistic virtual perspective of an accident scene. Other examples of external resources that can be used by the accident evaluation system 102 include, but are not limited to computer hardware, software, the Internet, global positioning systems, and global information systems.

The accident reconstruction application 110 transmits input data into an editable environment where a user may add a plurality of representative symbols to more accurately reflect the scene of an accident. Once a user has added sufficient detail to the accident scene, a visual perspective of the accident scene may be rendered. Rendering may produce a two-dimensional perspective of an accident scene. Rendering may also produce a three-dimensional perspective of an accident scene. A user can create different perspectives of an accident scene so that a reconstructed scene can be viewed in a variety of ways.

In another embodiment, the damage assessment application 112 of the accident evaluation system 102 allows a user to create a visual perspective representing the damage to a vehicle following an accident. The damage assessment application 112 displays a three-dimensional perspective of a vehicle. A user may select a vehicle type, year, make, and model from a key map programmed into the damage assessment application 112. The damage assessment application 112 may communicate with the external resource system 106 to download updates to the key map. A user may select a target area on the vehicle image. A target area is a point of reference on the vehicle image, and may be used to indicate both initial and collateral damage to a vehicle following an accident. The user may also indicate the severity of the damage to specific parts of the vehicle.

The damage assessment application 112 may communicate with the insurance claim system 104 to provide a three-dimensional perspective to an insurer, for use in assessing the vehicle damage. This three-dimensional perspective may be used in an insurance claim. The damage assessment application may be used to provide more realistic cost estimates for vehicle repair.

The external resource system 106 communicates with the accident evaluation system 102. The goal of the external resource system 106 is to enhance both the accident reconstruction application 110 and the damage assessment application 112. The external resource system 106 may receive requests from the accident evaluation system 102. The accident evaluation system 102 may receive data transmissions from the external resource system 106. As stated above, the external resource system 106 may be any physical or virtual component which can be used by the accident assessment and reconstruction system 100.

The insurance claim system 104 may communicate with the accident evaluation system 102 and the computer system 108. The insurance claim system 104 may be used to initiate an insurance claim following an automobile accident. An insurance claim can be initiated by an insurance company using the insurance claim system 104. An insurance claim may also be initiated remotely by a user through the accident evaluation system 102. The user may be a representative from the insurance company, or an insured member. The accident evaluation 102 communicates with the insurance claim system 104 to provide an insurance company with an accident reconstruction perspective as well as a damage assessment perspective.

An insurance claim may be initiated at the scene of an accident. This may be accomplished by a user through a computer system 108. As stated above, the computer system 108 may be a mobile device. Data gathering may occur at the scene of an accident or after an insurance claim is initiated. The insurance claim system 104 may receive data transmissions from the accident evaluation system 102. Data transmissions may include perspectives created by either the accident reconstruction application 110 or the damage assessment application 112. The accident evaluation system 102 may receive also receive a request for data from the accident evaluation system 106. A request for data may include a request for report data, which may be used to annotate or supplement a visual perspective created by either of the software applications.

A user may utilize the accident assessment and reconstruction system 100 to enhance the reliability of its accident reporting. Additionally a user may utilize the accident assessment and reconstruction system 100 to expedite the initiation of an insurance claim. The goal of the user is to create realistic visual perspectives to both reconstruct an accident scene and assess damage to a vehicle. The visual perspectives may then be included in accident reports. Accident reports may include but are not limited to insurance claims, police reports, and vehicle history reports. A user may be any person who uses the accident assessment and reconstruction system 100. A user may include but is not limited to an insured member, an insurance provider, a representative of an insurer, a party to the accident, a police officer, an accident scene respondent, a mechanic, an automobile manufacturer, an automobile dealer, or a computer system end user.

The user interacts with the accident evaluation system 102 through use of a computer system 108. A computer system 108 may be any device operating on a processor or microprocessor. In one embodiment, a graphical user interface may be used to allow computer operable instructions or programs to be executed on a processor of a computer system 108. A graphical user interface may display widgets which hold all of the data processed by an application of the accident evaluation system 102, and all of the available interactions with this data for a user to interact with. In one embodiment, the computer system 108 may be a mobile device that can be used at the scene of an accident. Mobile devices may include but are not limited to cellular phones, laptops, pocket personal computers, personal digital assistants, and tablet computers.

Figure 2:
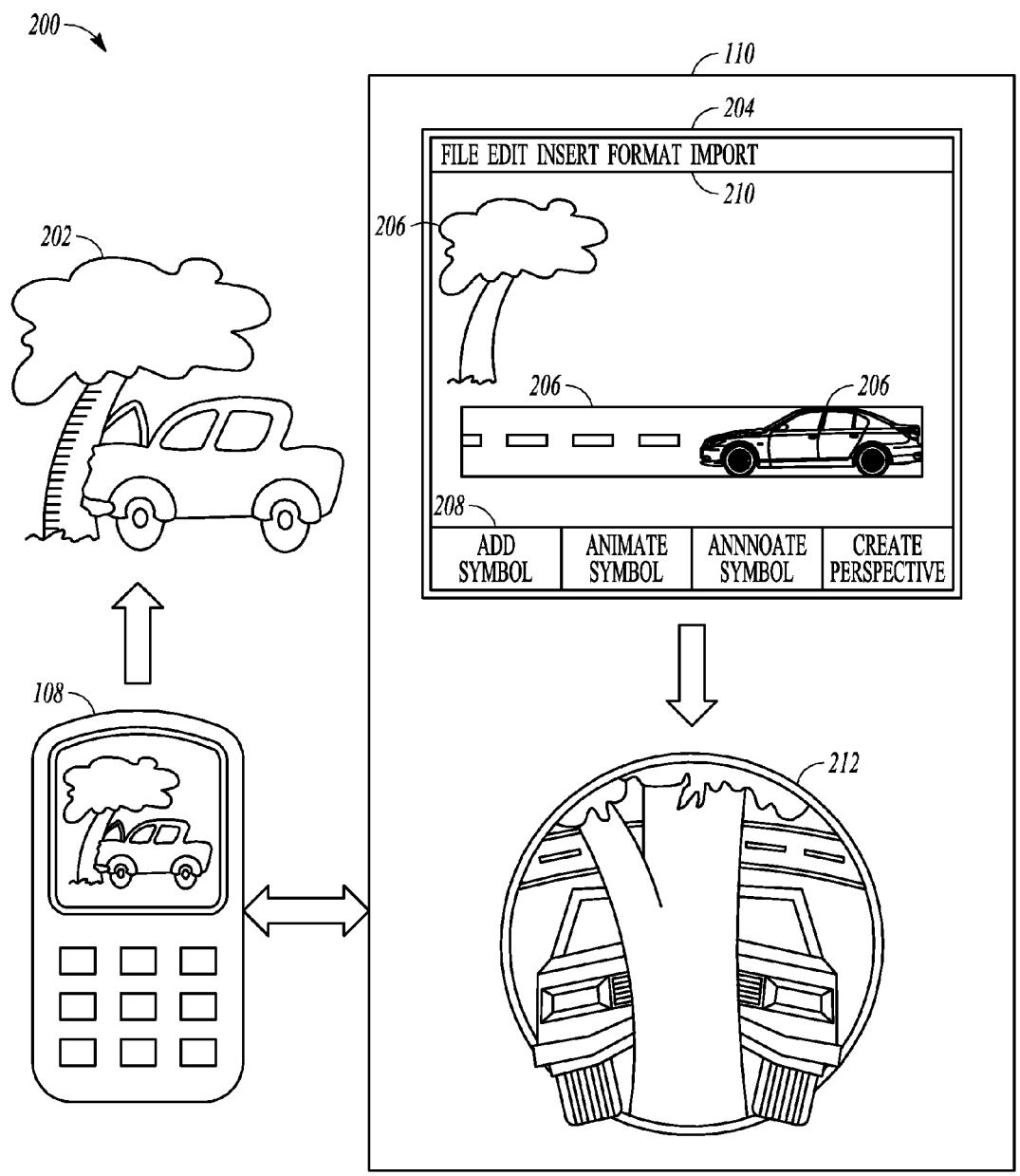
FIG. 2 is a functional block diagram illustrating a general overview of an accident reconstruction application according to an example embodiment.

FIG. 2 presents a functional block diagram illustrating a general overview of an accident reconstruction system 110 (as described in FIG. 1) according to an example embodiment (item 200). The overview 200 comprises a computer system 108, accident data 202, a screenshot of the accident reconstruction application 204, and a visual reconstruction of an accident 212. Further, overview 200 demonstrates the interaction a computer system 108 may have with the accident reconstruction system 110.

Accident data 202 results subsequently from the occurrence of an automobile accident. Accident data 202 can be anything that may help reconstruct the scene of an accident. Accident data 202 may take many forms. Accident data 202 may include but is not limited to photographs from the scene of an accident, video footage of the accident or from the scene of the accident, captured reenactments of the accident, location-specific data from the scene of an accident, report documentation of the accident, audio files, and the like.

A computer system 108 may be used to capture the accident data 202. The computer system 108 may communicate with the accident reconstruction application 110 to provide the accident reconstruction application 110 with the accident data 202. A request for input data may also be sent by the accident reconstruction application 110 to the computer system 108. The computer system 108 may also receive data transmissions from the accident reconstruction application 110. The computer system 108 may have a recording device to capture the accident data 202. In one embodiment, a computer system 108 may be a mobile or handheld device which is readily accessible at the scene of an accident. This embodiment may allow a user to more quickly and accurately capture the details of an accident.

Block 204 is a screenshot of the accident reconstruction application 110. The accident reconstruction application 110 receives accident data 202 from a computer system 108. The accident reconstruction application 110 provides a graphical user interface where a user may manipulate accident data 202 to create a visual reconstruction of an accident. A user may interact with the graphical interface of the accident reconstruction application 110 through attached computer peripherals or touch-screen capability. An editable environment is created where a user may add symbols 206, annotations, create motion, and ultimately create a visual perspective 212 of an accident among other things. In one embodiment, a user may be able to click on a toolbar 208 to navigate through a number of options aiding the creation of a visual perspective 212.

Block 204 also demonstrates how accident data 202 may translate to the accident reconstruction application 110. Accident data 202 may be imported from a computer system 108. Additionally, a user may add symbols 206 to reconstruct an accident scene. A keymap may be preloaded into the accident reconstruction application 110 to provide a user with a plurality of symbols 206 to choose from. Preloaded symbols 206 may include but are not limited to vehicles, objects, hazards, buildings and structures, roadways, people, animals, environmental aspects, and the like. At least one symbol 206 may have movement in the accident reconstruction to provide a more realistic visual representation of the accident occurrence. In one embodiment, a user may be able to click and drag a symbol 206 across a screen to represent movement.

The graphical user interface of the accident reconstruction application 110 may provide a user with window management capabilities 210. Window management capabilities 210 are designed to improve the functionality of the graphical user interface and provide support for computer hardware and software. In one embodiment, the accident reconstruction application 110 may contain a taskbar whereby a user can control and manage the accident reconstruction application 110. The window management capabilities 210 may interact with the graphical user interface to allow a user to perform functions including: creating, displaying, editing, formatting, inserting, deleting, saving, importing, printing, and uploading, among others.

The accident reconstruction application 110, shown in block 204, may be used to create and display a visual perspective 212 of an accident scene. A visual perspective 212 may be any visual depiction of an accident scene. The accident reconstruction application 110 may render a visual perspective 212 through use of a software rendering tool. A software rendering tool allows for rendering to occur entirely on a computer system's 108 processor or central processing unit. A software rendering tool minimizes the need for specialized computer hardware such as graphic cards and the like. However, computer hardware may be utilized by a computer system 108 and integrated with the accident reconstruction application 110 to aid and enhance the rendering process.

In one embodiment, a visual perspective 212 may be two-dimensional. In another embodiment, a visual perspective 212 may be three-dimensional. A three-dimensional visual perspective 212 may be created by the accident reconstruction application 110 utilizing a software rendering tool through either pre-rendering or real-time rendering. Pre-rendering or offline rendering, is any rendering that is not in real-time. Pre-rendering may involve video footage or data that has previously been rendered in some way. Pre-rendering may be used to create realistic images or movies. Real-time rendering may be used to interactively render a scene.

Figure 3:
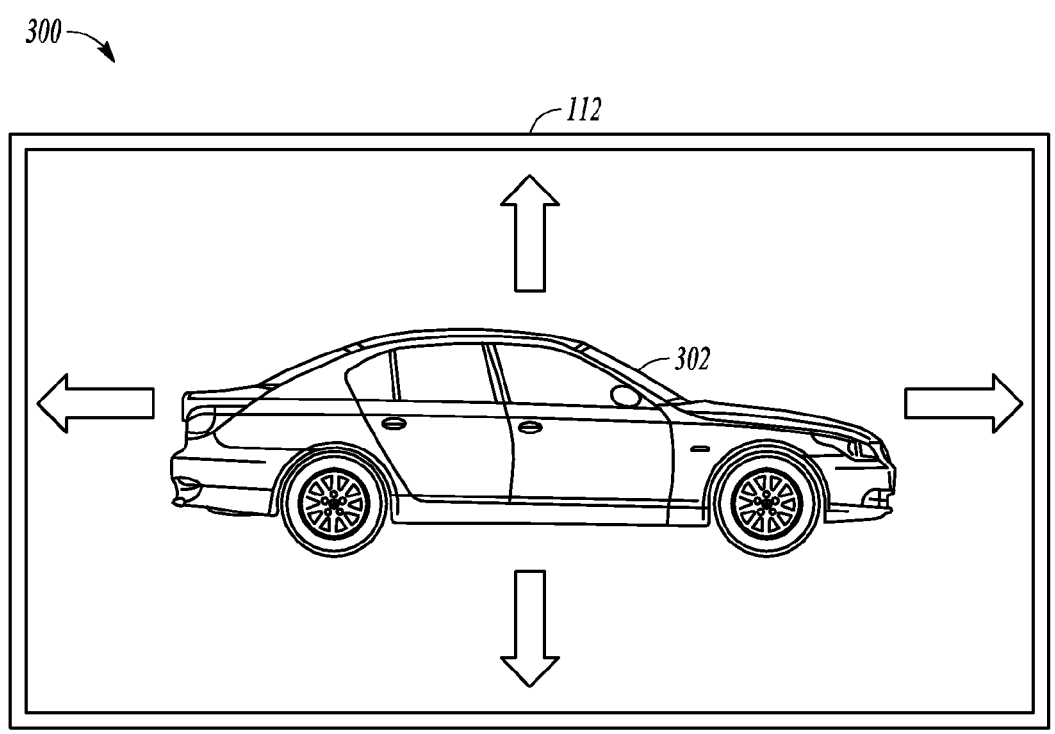
FIG. 3 is a perspective view of a screenshot illustrating a damage assessment application according to an example embodiment.

FIG. 3 is a perspective view, illustrating a screenshot 300 of a damage assessment application 112. The damage assessment application 112 (referenced in FIG. 1) may be used to create a visual perspective of the damage to a vehicle which has been involved in an accident. Similar to the accident reconstruction application 110, the damage assessment application 112 may operate on and communicate with a computer system 108. The damage assessment application 112 may be utilized on any computer system 108. A graphical user interface allows a user to interface with the damage assessment application 112. A user may interact with the graphical interface of the damage assessment application 112 through attached computer peripherals or touch-screen capability.

The screenshot 300 displays one embodiment of the damage assessment application 112. The damage assessment application 112 may display a three-dimensional vehicle image 302. In one embodiment, a user may select the three-dimensional vehicle image 302 to display. Vehicle types and images may be preloaded into the damage assessment application 112. Vehicle types and images may also be obtained and integrated with the damage assessment application 112 through the external resource system 106 (referenced in FIG. 1). A software rendering tool may be utilized to display the three-dimensional vehicle image 302. Computer hardware may also be used to render and display the three-dimensional image 302.

The graphical user interface may allow a user to manipulate the three-dimensional vehicle image 302 to realistically illustrate the damage to a vehicle. The graphical user interface may allow a user to rotate the three-dimensional vehicle image 302 to view specific parts of the vehicle. In one embodiment, a user may be able to select specific areas of the vehicle and indicate the severity of damage to the vehicle. The three-dimensional vehicle image 302 may update to reflect any damage resulting from an accident.

Methods

In this section, particular methods for damage assessment and reconstruction example embodiments are described by reference to a series of flow charts. The methods to be performed constitute computer programs made up of computer-executable instructions.

Figure 4:
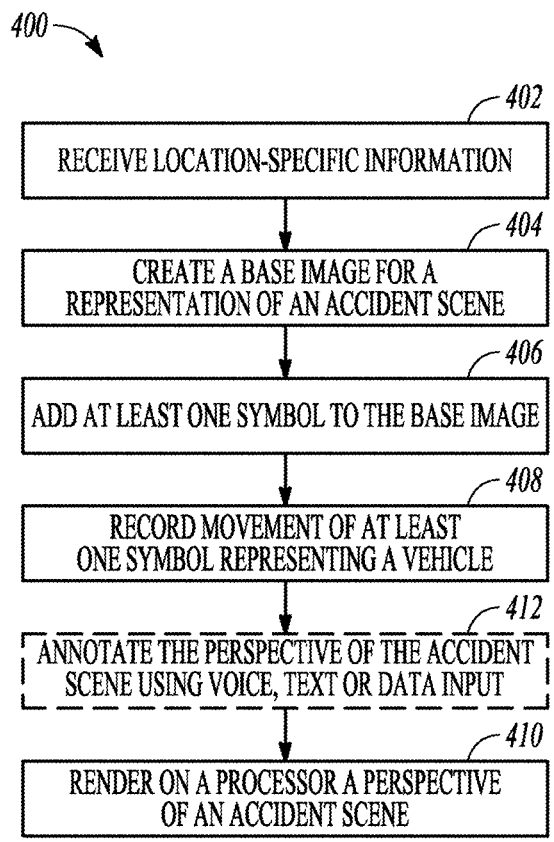
FIG. 4 is a block diagram illustrating a method to reconstruct an accident scene according to an example embodiment.

FIG. 4 is a block diagram illustrating a method 400 to reconstruct an accident scene. The method 400 represents one possible embodiment of the accident reconstruction application 110 (referred to in FIG. 1). The method 400 comprises receiving location-specific information for an accident scene (block 402), creating a base image for a representation of the accident scene using the location-specific information (block 404), adding at least one symbol to the base image to create a representation of the accident scene (block 406), recording movement of at least one symbol representing a vehicle in the accident scene (block 408), and rendering on a processor a perspective of the accident scene including base image, the at least one symbol and the movement (block 410).

Block 402 refers to receiving location-specific information for an accident scene. Location-specific information may pertain to any geographical or spatially defined area. In one embodiment, a location may be the scene of an accident. Location-specific information may include but is not limited to maps, geographic data, weather data, time data, tracking data, satellite imagery, images and photographs, drawings, audio, videos, and other computer data. Location-specific information may be received by the accident reconstruction application 110. The location-specific information of block 402 may be received from an external resource system 106 (referenced in FIG. 1). Alternative embodiments may pull the location-specific information from external resources such as global positioning systems, global information systems, or satellite systems.

In one embodiment, location-specific data may be used to create a base image for a representation of an accident scene (block 404). The accident reconstruction application 110 receives location-specific information (block 402) from the external resource system 106. In one embodiment, the base image may create a background for the accident scene. However, the base image does not have to be a background. The base image may be any visual representation that can used to begin reconstruction of an accident scene.

Block 406 refers to adding at least one symbol to the base image to create a representation of the accident scene. As described in FIG. 2, a symbol 206 may be anything representative of an accident scene. In one embodiment, a symbol 206 may be any element depicted from a diagram of an accident scene in a police report or insurance loss report. A keymap may be preloaded into the accident reconstruction application 110 to provide a user with a plurality of symbols 206 to choose from. Some of the other possible examples of the plurality of symbols to choose from are given above in the description of FIG. 2. The graphical user interface of the accident reconstruction application 110 may allow a user to interactively add or remove symbols 206 to an accident scene.

Furthermore, block 408 refers to recording movement of at least one symbol representing a vehicle in the accident scene. As described above, a user may interact with the graphical user interface of the accident reconstruction application 110 to record movement of a symbol 206. In one embodiment, a user may be able to click and drag a symbol 206 across a screen to represent movement. The accident reconstruction application 110 will receive data representing a change in position of a symbol 206 when a user drags the symbol from one position to another position (e.g., a starting position to an ending position).

Block 410 refers to rendering on a processor a perspective of the accident scene including base image, the at least one symbol and the movement. As described in FIG. 2, rendering may be executed on a processor through use of a software rendering tool. Rendering may also be accomplished through use of computer hardware attached to a computer system 108 (referenced in FIG. 1). Block 410 may produce a two-dimensional visual perspective 212 (referenced in FIG. 2) of an accident scene. Block 410 may also produce a three-dimensional visual perspective 212 of an accident scene. The visual perspectives may be integrated in reporting tools such as police reports, accident reports, insurance loss reports, and data gathering for legal matters.

An alternative embodiment of FIG. 4 further comprises annotating the mapped accident scene using voice, text, or data input (block 412). Annotating may include providing documentation to further detail a visual perspective 212. This may be helpful if a visual perspective of an accident reconstruction is integrated with reporting tools.

Figure 5:
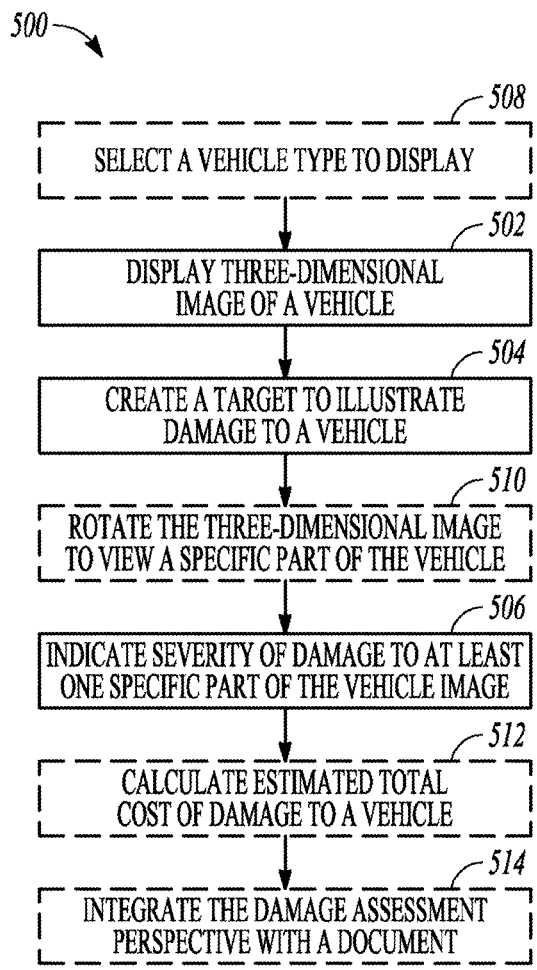
FIG. 5 is a block diagram illustrating a method to assess vehicle damage according to an example embodiment.

FIG. 5 is a block diagram illustrating a method 500 to assess vehicle damage. The method 500 comprises displaying a three-dimensional image of a vehicle (block 502), creating a target illustrating initial damage and collateral damage to the vehicle (block 504), and indicating severity of damage to at least one specific part of the vehicle (block 506).

Block 502 refers to displaying a three-dimensional image of a vehicle. Refer to the description of FIG. 3 above for a description of block 502.

Block 504 refers to creating a target illustrating initial damage and collateral damage to the vehicle. Refer to the description of the damage assessment application 112 in FIG. 1 above for a description of a target. A user may utilize a graphical user interface to interact with the damage assessment application 112 through attached computer peripherals or touch-screen capability. In one embodiment, a user may select a specific part of the three-dimensional vehicle image to create a target illustrating damage (block 504). Block 504 may comprise selecting a point of impact on the vehicle. This may include selecting specific parts of the vehicle image. The damage assessment application 112 may allow the user to rotate the three-dimensional image of the vehicle (as referenced in FIG. 3) in order to view the many parts of an automobile including the front-end, back-end, left side, right side, underbody, roof, trunk, interior, and engine area (block 510). In one embodiment, the damage assessment application 112 through the user interface, may provide a user with the ability to zoom in and zoom out on the three-dimensional vehicle image.

Block 506 refers to indicating severity of damage to specific parts of the vehicle. Block 506 may coincide with Block 504. A user may create a target referring to a specific part of the vehicle and indicate the severity of damage to the vehicle in a simultaneous fashion. In one embodiment, the damage assessment application 112 may allow a user to select a color code to indicate the degree of damage caused to a specific part of a vehicle. In an embodiment where a color code may be used, red may indicate severe damage to a vehicle part, yellow may indicate moderate damage to a vehicle part, and green may indicate minor damage to a vehicle part. After a selection is made, the three-dimensional vehicle image may update to create a more accurate representation of the vehicle damage.

Block 508 refers to selecting a vehicle type to display as the three-dimensional image of the vehicle. Refer to the description of FIG. 3 above for a description of block 508.

In an alternative embodiment, block 512 refers to calculating an estimated cost of total damage to the vehicle. After the damage to a vehicle is indicated, the damage assessment application 112 may interact with the external resource system 106 (referred to in FIG. 1) to provide realistic damage estimates.

Yet another alternative embodiment includes integrating a damage assessment perspective with a document (block 514). One example of a document may be an audit appraisal. Other examples of documents include but are not limited to insurance loss reports, accident reports, police reports, litigation and dispute resolution support, and affidavits, among others.

Figure 6:
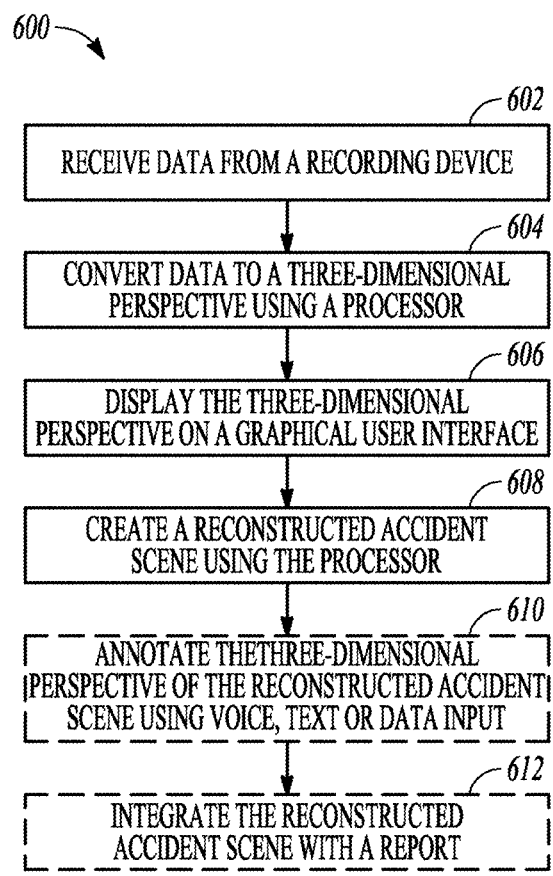
FIG. 6 is a block diagram illustrating a method for accident reconstruction, according to an example embodiment.

FIG. 6 a block diagram illustrating computer readable medium instructions 600 operable on a computer system for accident reconstruction. The instructions 600 comprise receiving data from a recording device, the data representative of movement from a two-dimensional perspective of at least one vehicle in an accident (block 602), converting the data from the two-dimensional perspective to a three-dimensional perspective using the processor (block 604), displaying the three-dimensional perspective on a graphical user interface (block 606), and creating a reconstructed accident scene by using the processor to add at least one symbol to the three dimensional perspective on the graphical user interface wherein the at least one symbol represents a component of an accident scene (block 608).

Block 602 refers to receiving data from a recording device. A recording device may be connected to a computer system, such as the computer system 108 referenced in FIG. 2. A recording device may be used to record images, movies, and computer data, among other things. In one embodiment, the recording device may be used to capture data of a moving object which represents a vehicle in an automobile accident. There may be more than one moving object captured by the recording device. In one embodiment, the recorded data captured by the recording device (block 602) may be in a two-dimensional perspective.

Block 604 refers to converting the data of the two-dimensional perspective to a three-dimensional perspective using a processor. The processor may be connected to a computer system, such as the computer system 108 referenced in FIG. 2. In one embodiment, the conversion from a two-dimensional perspective to a three-dimensional perspective may occur on a processor using a software rendering tool. Refer to the description of FIG. 2 for additional detail pertaining to a software rendering tool.

Block 606 refers to displaying a three-dimensional perspective on a graphical user interface. The graphical user interface may be part of the accident reconstruction application 110 as described in FIG. 1. Furthermore, the graphical user interface may be linked to a computer system such as the computer system 108 described in FIG. 2.

Block 608 refers to creating a reconstructed accident scene by using the processor to add at least one symbol to the three dimensional perspective on the graphical user interface wherein the at least one symbol represents a component of an accident scene. Refer to the description of FIG. 2 for a detailed description on creating a reconstructed accident scene by adding symbols to the three-dimensional perspective.

One alternative embodiment further comprises annotating the three-dimensional perspective using voice, text, or data input (block 610). Annotating may include providing documentation to further detail a three-dimensional perspective. This may be helpful if the three-dimensional perspective of an accident reconstruction is integrated with reporting tools.

Yet another alternative embodiment further comprises integrating the reconstructed accident scene with a report (block 612). A report may include but is not limited to police reports, accident reports, insurance loss reports, and data gathering for legal matters.

Example Implementations

Various examples of computer systems and methods for embodiments of the present disclosure have been described above. Listed and explained below is an alternative embodiment of the accident reconstruction application 110 (referenced in FIG. 1.

In some implementations, a web-based or native application is provided that allows a diagram of the accident to be constructed and filed under, e.g., an insured's customer number to augment a loss report. A loss report number may be to the loss report. The application may be multi-layered, which allows the graphical anatomy of the accident scene (i.e., streets, streetlights or signs, direction of each street, etc.) to be captured either by using standard templates or customized templates (e.g., such as going to Google® maps for information).

A second layer is the actual car placement in the accident scene. The car placement may be superimposed on the Google® map orientation template or drawn directly on the standard template. Then, a written description (i.e., loss summary overview) may be featured alongside the diagram for a thorough re-enactment of the accident. Symbols provided in the application allow the user to depict the scene of the accident with consistency.

Once the user has captured the essence of the accident in the diagram, it may be uploaded to the insurance company's website or, if generated by a representative, sent by e-mail or made available to the insured. The insured may verify the accuracy of the diagram by downloading the document, opening it as an attachment, or viewing it on the insurance company's website. If adjustments need to be made to the diagram, the insured and a service representative may speak to one another in real-time about the details, while the service representative makes the amendments.

Figure 7:
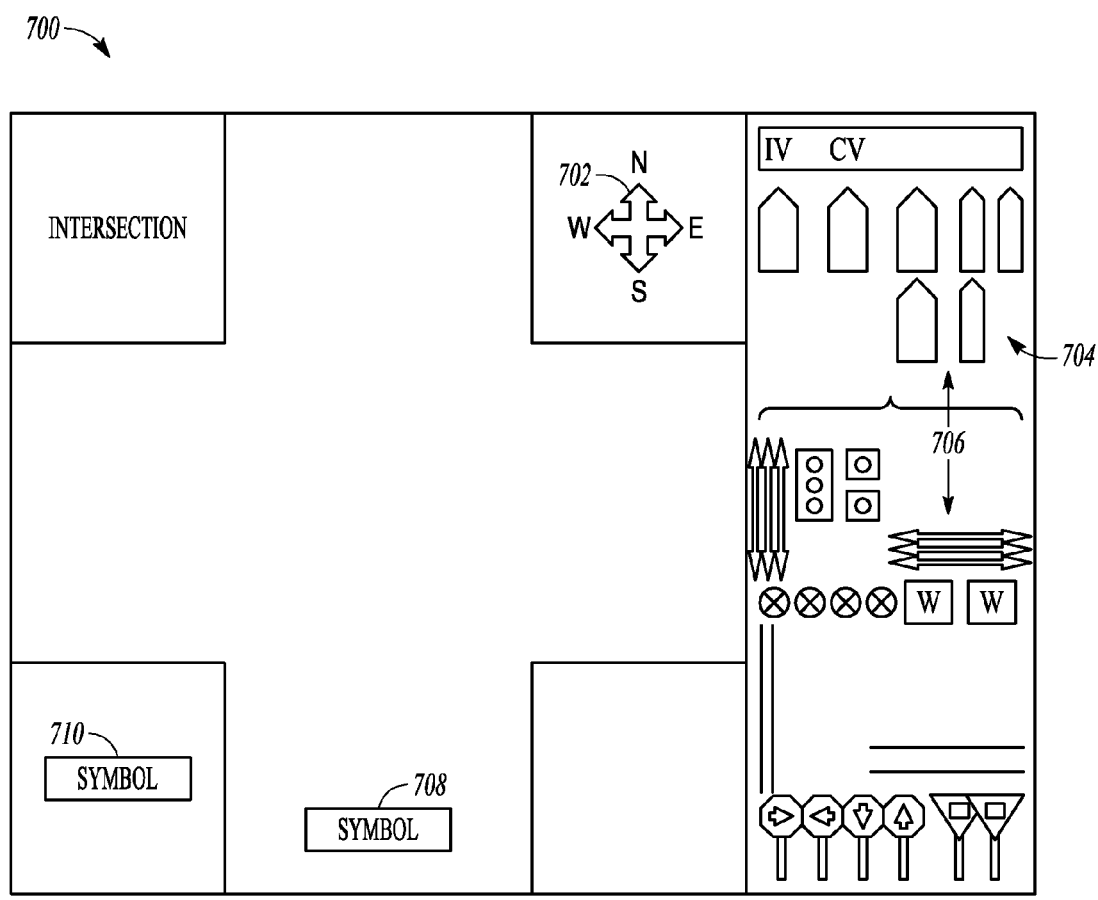
FIGS. 7-15 illustrate exemplary templates for diagrammatically recording an accident scene.

FIGS. 7-15 illustrate exemplary templates that may be used to represent an accident scene. Referring now to FIG. 7, there is illustrated an intersection template 700 (base image as referred in FIG. 4). The intersection template 700 includes a navigational instrument 702 to indicate a direction of the intersection shown in the intersection template 700. A keymap 704 is provided with the intersection template 700, and includes a plurality of symbols 706 that may be used to represent objects in the intersection. As is understandable, the plurality of symbols 706 provided within the keymap 704 (or any others of the templates) may be altered to present symbols that are most relevant to the selected template. An insured vehicle may represent the vehicle insured by the insurance provider (as described in detailed description of FIG. 1) for which a loss is being claimed. This may be the user's vehicle. A collision vehicle may be used to indicate a vehicle involved in an accident with the insured vehicle. Witness vehicles may be used to indicate drivers of vehicles that witnessed an accident between the insured vehicle and the collision vehicle. Uninvolved vehicles are vehicles that may have been proximate to the accident scene, however drivers of these vehicles did not witness, nor were they involved in an accident between the insured vehicle and the collision vehicle.

Road control symbols may be provided such as the user may drag and drop road control signals, line markings, directionality arrows, and the like to represent the accident scene as it occurred from the plurality of symbols 706 located within the keymap 704. For example, the road control symbols may include, but are not limited to, traffic flow arrows, traffic lights, stop signs showing direction of control, yield signs, dashed line showing ways within the roadway, flashing lights, solid lines within the roadway, indications of curbs, building symbols, etc. which one of ordinary skill in the art would recognize that any object on or near a roadway may be represented by a symbol through the selection from the plurality of symbols 706 that are presented to the user in the keymap 704 when diagramming within the intersection template 700.

Informational symbols 708 and 710 may be included in the intersection template 700 to indicate road names, or building names (i.e. commercial establishments, office buildings, restaurants, etc.) near an accident scene. The use of the plurality of symbols 706 will be more fully described with reference to FIG. 15, below.

Figure 8:
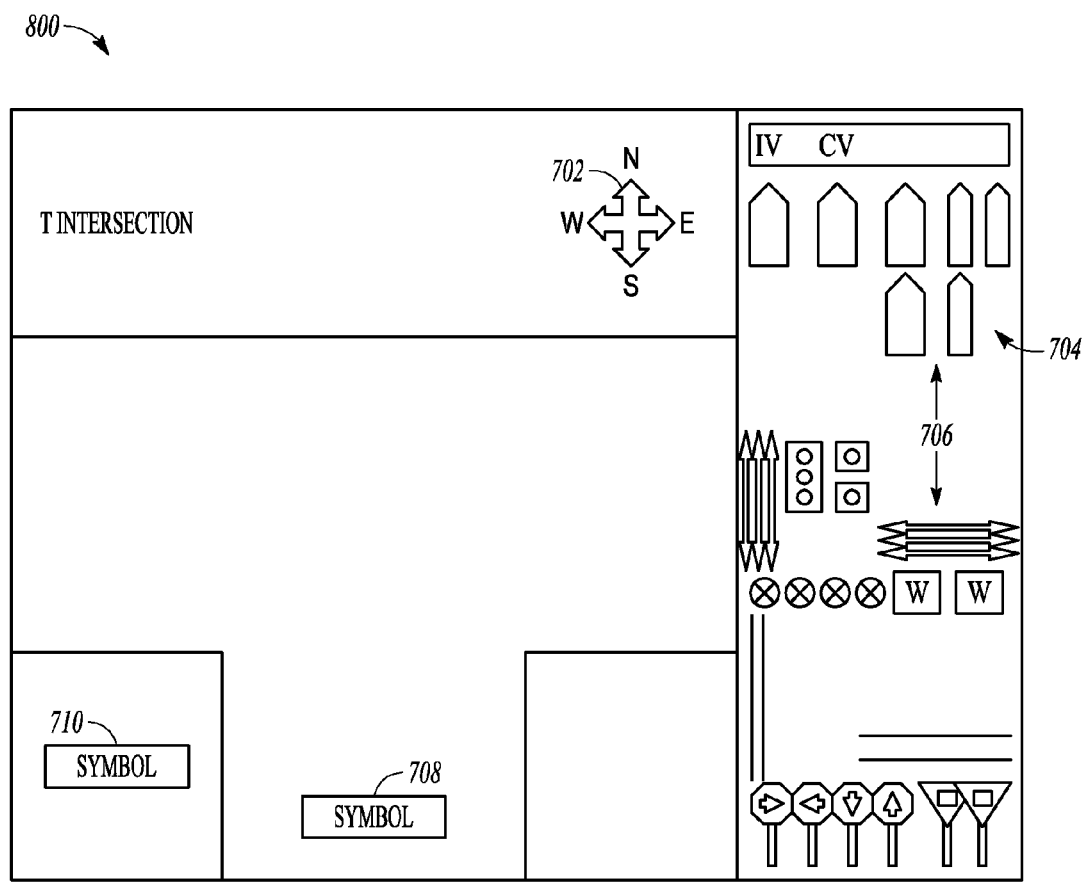

FIG. 8 illustrates an exemplary T-intersection template 800. As shown in FIG. 8, the T-intersection template 800 is substantially similar to the intersection template 700 (as described in FIG. 7) and includes the same keymap 704. However, the T-intersection template 800 is initially loaded to represent a T-intersection between two roadways. The T-intersection template 800 is editable, whereby a user can select from a plurality of symbols 706 (as described in FIG. 7) to add to the T-intersection template 800.

Figure 9:
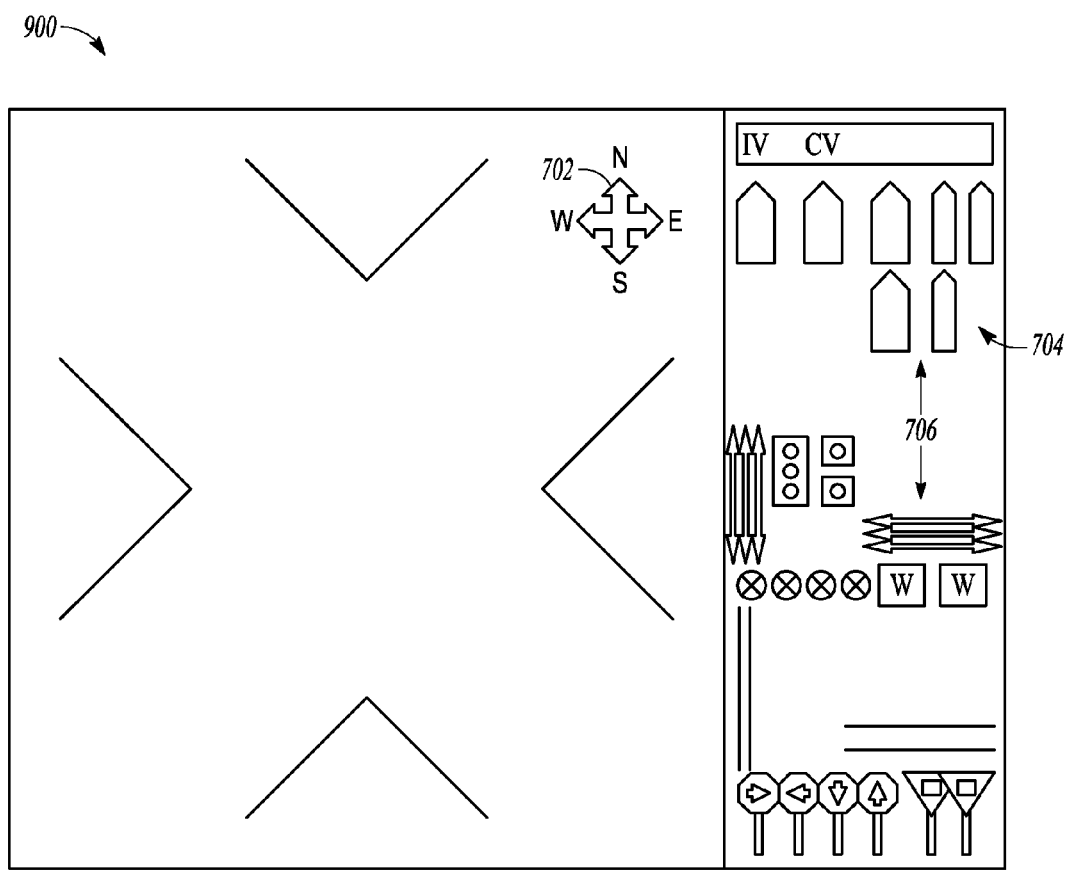

FIG. 9 illustrates an exemplary X-intersection template 900 (base image as referred in FIG. 4) and includes a keymap 704 (as described in FIG. 7). As shown in FIG. 9, the X-intersection template 900 is initially loaded to represent roadways intersecting at a 45° angle with respect to a horizontal and vertical. The X-intersection template 900 is editable, whereby a user can select from a plurality of symbols 706 (as described in FIG. 7) to add to the X-intersection template 900.

Figure 10:
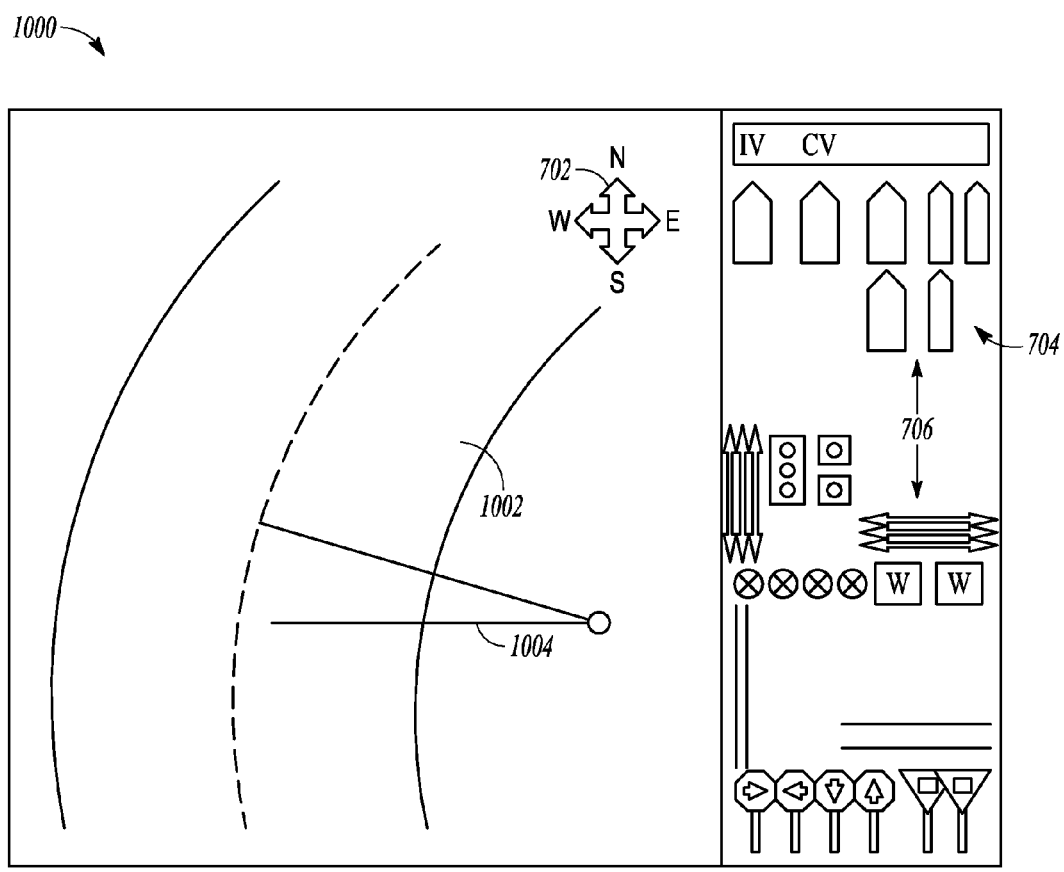

FIG. 10 illustrates an exemplary curved roadway template 1000 (base image as referred in FIG. 4) and includes a keymap 704 (as described in FIG. 7). The curved roadway template 1000 illustrates a roadway 1002 that may be altered to accurately represent an angle of curvature 1004 of the roadway 1002. For example, the user may drag and hold the roadway 1002 to alter the angle of curvature 1004. The curved roadway template 1000 is editable, whereby a user can select from a plurality of symbols 706 (as described in FIG. 7) to add to the curved roadway template 1000.

Figure 11:
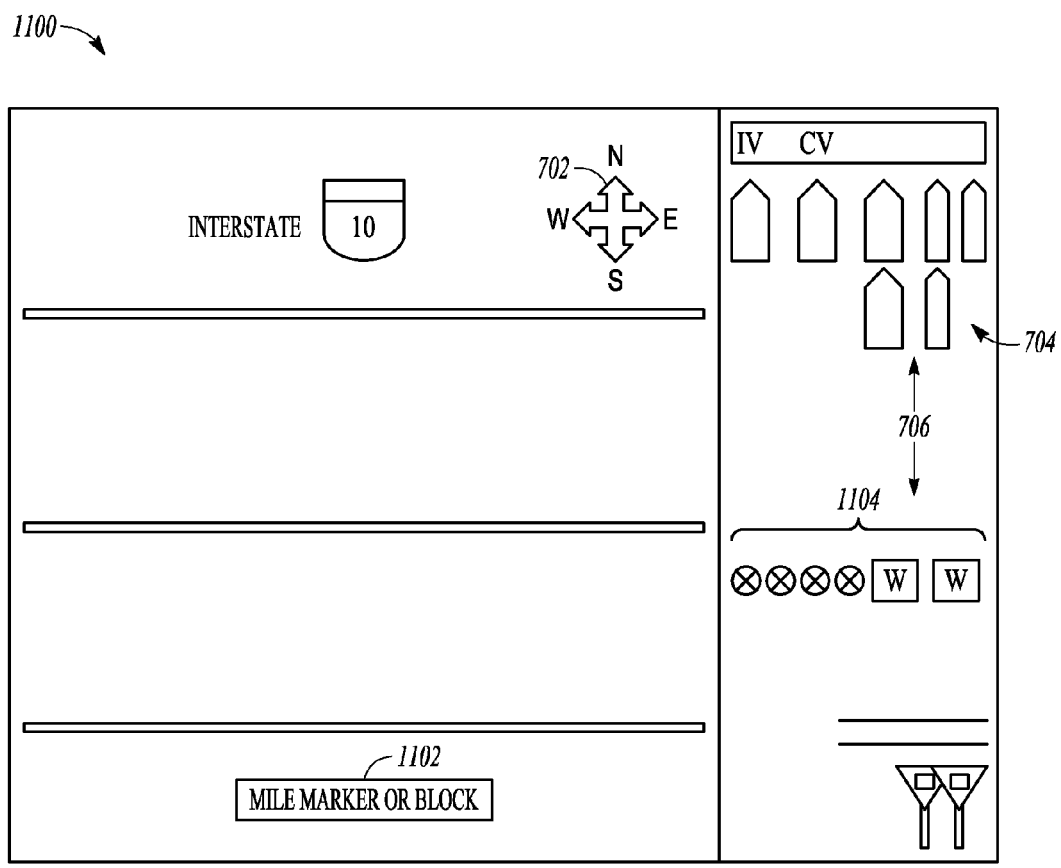

FIG. 11 illustrates an exemplary east-west interstate template 1100 and includes a keymap 704 (as described in FIG. 7). As is common, east-west interstates have even numbers (e.g., Interstate 10). A mile marker or blocking symbol 1102 is provided to illustrate where on the east-west interstate accident may have occurred. Within the keymap 704, a set of road control symbols 1104 are provided that may include road control symbols commonly found on interstate roadways. For example, the road control symbols 1104 in the east-west interstate template 1100 may include dashed lines to indicate lines in the roadway, yield signs, solid lines indicating travel lanes were passing is not allowed, etc. The east-west interstate template 1100 is editable, whereby a user can select from a plurality of symbols 706 (as described in FIG. 7) to add to the east-west interstate template 1100. As is understandable, the plurality of symbols 706 provided within the keymap 704 (or any others of the templates) may be altered to present symbols that are most relevant to the selected template. Thus, the road control symbols presented in the east-west interstate template 1100 and control symbols presented in the intersection template 700 in accordance with a type of roadway.

Figure 12:
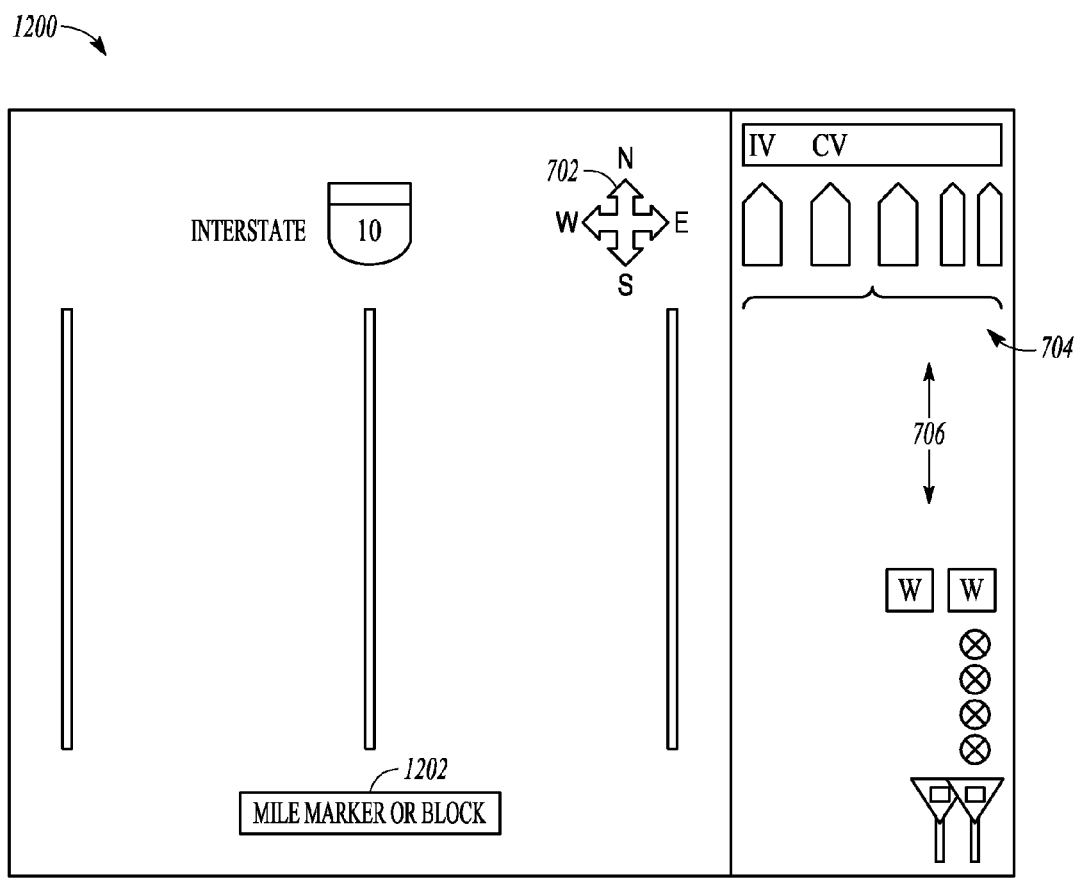

FIG. 12 illustrates an exemplary north-south interstate template 1200 and includes a keymap 704 (as described in FIG. 7). North-south interstates typically have odd numbers (e.g., Interstate 35). Similar to the east-west interstate template 1100, a mile marker or block symbol 1202 is provided to indicate a location where the accident may have occurred. The north-south interstate template 1200 is editable, whereby a user can select from a plurality of symbols 706 (as described in FIG. 7) to add to the north-south interstate template 1200. The plurality of symbols 706 may be tailored towards road control elements found on the interstate roadways.

Figure 13:
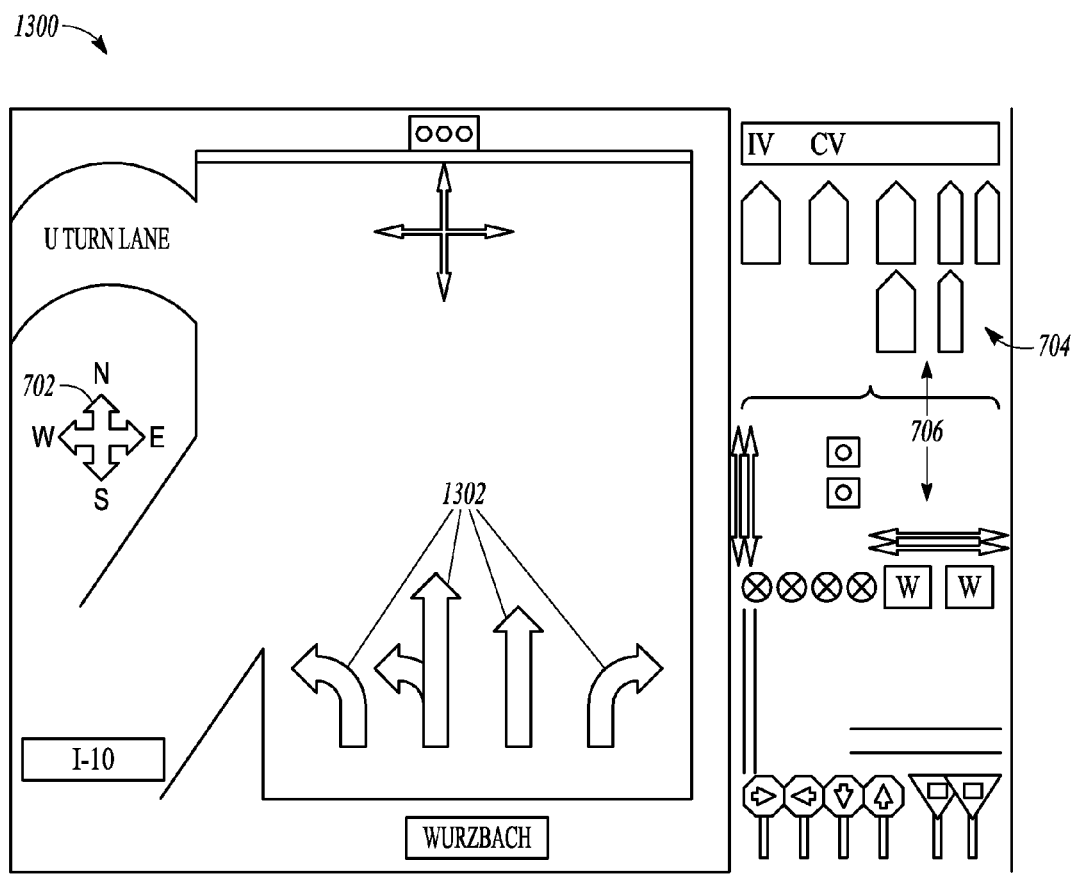

FIG. 13 illustrates an exemplary exit ramp template 1300 having a keymap (as described in FIG. 7). As shown in FIG. 13, the interstate (Interstate 10) exits to a surface street (Wurzbach Road). Directional arrows 1302 are provide to indicate traffic flow on the surface street. The plurality of symbols 706 (as described in FIG. 7) may be applied to the exit ramp template 1300 and tailored to exit ramp environments. The plurality of symbols 706 may include road control objects typically found near an exit ramp of interstate as it joins surface street roadways. It is noted that a template similar to exit ramp template 1300 may be created for entry ramps to an interstate.

Figure 14:
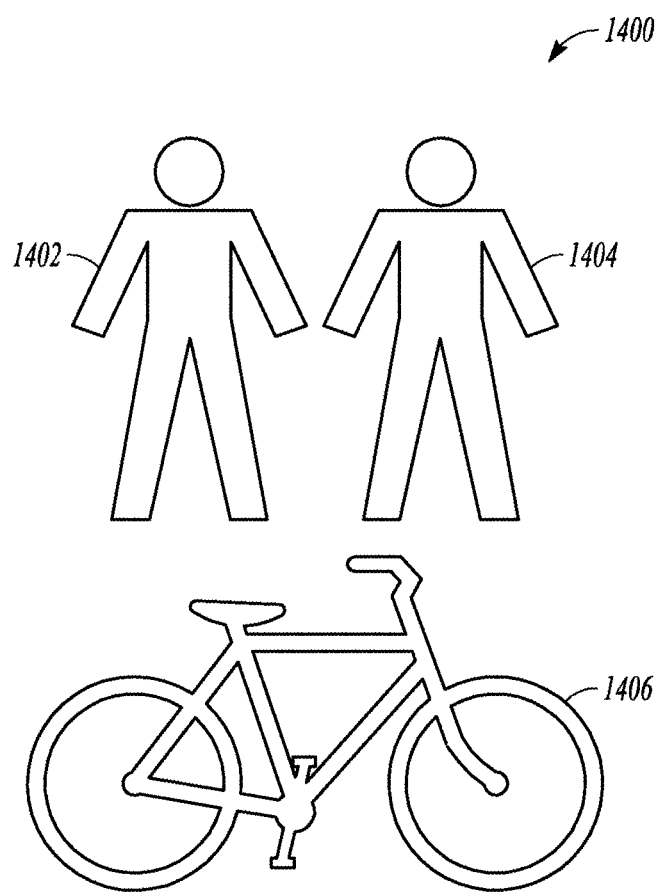

FIG. 14 illustrates additional symbols 1400 that may be used to represent objects ad an accident scene. These symbols may be part of the plurality of symbols 706 (as described in FIG. 7) that may be accessed by a user through the keymap 704. Symbols 1402 and 1404 represent people that may have been at, or involved in, the accident scene. Symbol 1402 represents a person who survived the accident, whereas symbol 1404 represents a person who may have been killed at the accident scene. Symbol 1406 represents a bicycle that may have been at the accident scene. As can be readily understood, additional symbols may be provided to represent any and all objects at an accident scene, including but not limited to, animals, trees, structures, large vehicles such as buses and trucks, etc. The additional symbols may be presented in the symbol presentation areas of the templates or by accessing them through a separate dialog presented in a user interface.

Figure 15:
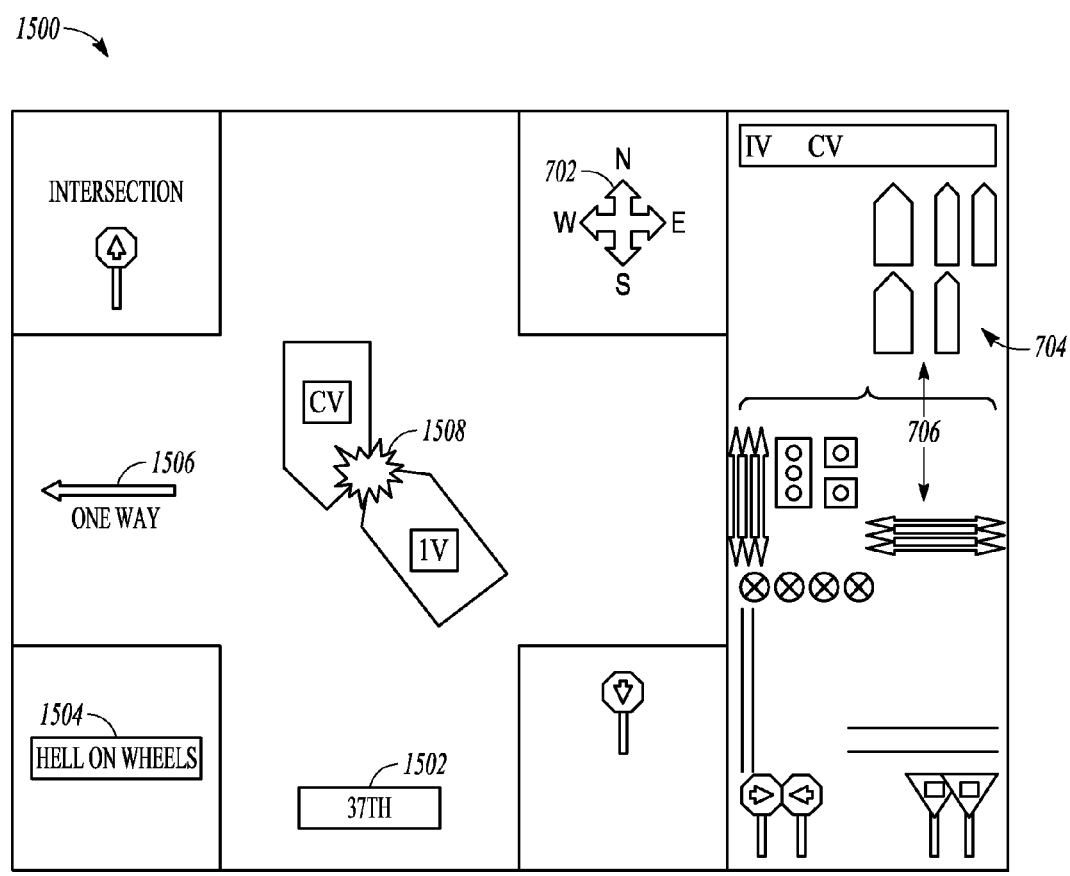

FIG. 15 illustrates an exemplary accident scene diagrammed in the intersection template 700 (as described in FIG. 7). The intersection template may include a set of directional arrows 1506 to indicate a direction of the intersection shown. A keymap 704 is provided within the accident reconstruction application 110 (described in FIG. 1) and includes a plurality of symbols 706 (as described in FIG. 7). The plurality of symbols 706 may be used to represent objects in the accident scene. The plurality of symbols 706 may be provided such as the user may drag and drop road control signals, line markings, directionality arrows, and the like to represent the accident scene as it occurred. For example, the plurality of symbols 706 may include, but are not limited to, traffic flow arrows, traffic lights, stop signs showing direction of control, yield signs, dashed line showing ways within the roadway, flashing lights, solid lines within the roadway, indications of curbs, building symbols, etc., which one of ordinary skill in the art would recognize.

Informational symbols 1502 and 1504 (as described in FIG. 7 with respect to symbols 708 and 710, respectively), may be included with the intersection template 700 to indicate road names, or building names (i.e. commercial establishments, office buildings, restaurants, etc.) near an accident scene. Both informational symbols 1502 and 1504 are editable by a user. A user may drag and drop any of the plurality of symbols 706 within the intersection template 700. Vehicle symbols are examples of the plurality of symbols 706 which may be placed on the roadway by dragging the appropriate symbol from the keymap 704 onto the roadway. A point of impact may be shown by placing an impact symbol 1508. Roadway control symbols (e.g. stop signs) may be selected from the plurality of symbols 706, and are placed in the appropriate location to indicate traffic control signs at the accident scene. This provides an added layer of detail.

Informational symbols 1502 and 1504, respectively, as well as directional symbols 1506 may be labeled to provide relevant information regarding the accident scene. For example, because the horizontal roadway is a one way street, additional directional symbols 1506 may be placed on the roadway to indicate the direction of travel. To further detail the accident scene, the name the commercial establishment at the southwest corner is indicated in the informational symbol 1504. The north-south road may be named in the informational symbol 1502 (e.g. 37th). Additionally, the external resource system 106 (referenced in FIG. 1) may be used to enhance the capabilities of the accident reconstruction application 110. For example, satellite imagery of the accident scene may be downloaded based on the street names of the intersection, a GPS location, latitude and longitude, a ZIP code, or any other means to identify a location and associated with the completed diagram. A navigational instrument 702 (as referenced in FIG. 7) may be added to the intersection template 700 for determining direction relative to the earth's magnetic poles. Satellite imagery may be retrieved from such providers as Google® or Microsoft®. In some implementations, a map of the area may be provided to augment the diagram. The map may be a street map, elevation map, release map, etc. to provide additional details of the terrain of the accident scene. In some implementations, traffic information may be provided to augment the diagram. This may be useful to determine if traffic flow is heavy or light, and to determine if traffic may have been a factor in the accident.

Figure 16:
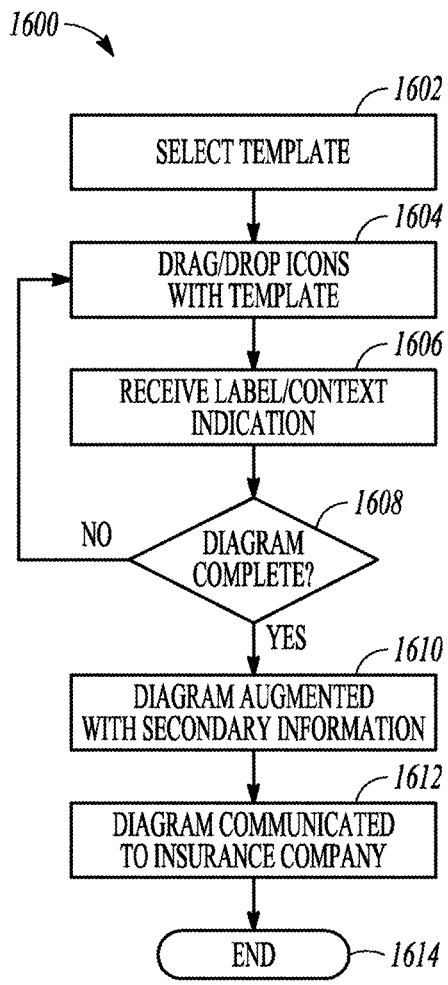
FIG. 16 illustrates an exemplary operational flowchart of diagramming an accident scene within a template.

FIG. 16 illustrates an exemplary operational flowchart 1600 of diagramming an accident scene within a template. At 1602, the user selects a template that best represents the accident scene. This may be the first layer of the diagramming surface.

At 1604, the user drags and drops symbols within the template. As shown in FIG. 15, the insured vehicle and collision vehicle are placed on the roadway by dragging the appropriate symbols from the keymap 704 (as referenced in FIG. 7) onto the roadway. A point of impact may be shown by placing an impact symbol 1508. Roadway control symbols (e.g. stop signs) may be selected from the plurality of symbols 706 located in the keymap 704. Individual symbols may be placed by the user into the appropriate location to indicate traffic control signs at the accident scene. This may be the second layer of the diagramming surface.

At 1606, labels and context indications are received. The informational symbols 1502 and 1504 (as described in FIG. 15), as well as directional symbol 1506 may be labeled to provide relevant information regarding the accident scene. For example, because the horizontal roadway is a one way street, additional symbol 1506 may be placed on the roadway to indicate the direction of travel. To further detail the accident scene, the name the commercial establishment at the southwest corner is indicated in the informational symbol 1504. The north-south road may be named in the informational symbol 1502 (e.g. 37th).

At 1608, it is determined if the diagram is complete. For example, the user may press a complete or save button in a display area to indicate that the diagram is complete. If the diagram is not complete, or if the user decides to make changes to the diagram, control returns to 1604.

If the user indicates that the diagram is complete at 1608, then at 1610, the diagram may be augmented with secondary information. For example, satellite imagery of the accident scene may be downloaded based on the street names of the intersection, a GPS location, latitude and longitude, a ZIP code, or any other means to identify a location and associated with the completed diagram. Satellite imagery may be retrieved from such providers as Google® or Microsoft®. In some implementations, a map of the area may be provided to augment the diagram. The map may be a street map, elevation map, release map, etc. to provide additional details of the terrain of the accident scene. In some implementations, traffic information may be provided to augment the diagram. This may be useful to determine if traffic flow is heavy or light, and to determine if traffic may have been a factor in the accident.

In some implementations, the secondary information may be a written statement provided by the user describing the accident scene. This written statement may be provided by the user, by witnesses, or by local officials who were present at the accident scene. In some implementations, photographs may be provided as secondary information. These may be photographs taken by the computer system 108 (referenced in FIG. 1) or another camera at the scene. In some implementations, audio information may be provided as secondary information. Using a microphone of the computer system 108, or other suitable recording device, an insured may record audio notes regarding the accident scene and events that occurred.

At 1612, the diagram and any secondary information are communicated to the insurance company. For example, the diagram may be uploaded to the insurance provider through a server by authenticating the user with the insurance company's website. In some implementations, the user may e-mail the diagram to a predetermined e-mail address provided by the insurance provider for receipt of loss reports. In some implementations, the user may upload the diagram using secure mechanisms such as secure FTP, SSL, or through a VPN connection to the insurance company servers. As a result of the communication of the diagram to the insurance company, the diagram is placed into the repository as part of the loss report for a claim due to the accident.

At 1614, the process ends and the user exits the diagramming application.

In some implementations, the diagramming application, its user interface, and process flow as described with reference to FIGS. 7-15 may be accomplished by providing a native application on the computer system 108. The native application may be downloaded from the insurance provider and installed on the computer system 108. The native application may present one or more of the templates shown in FIGS. 7-13 in response to a user selection of a type of intersection or roadway on which the accident occurred. The template may then be displayed in the native application and receive inputs from the user as described with reference to FIGS. 15 and 16. The native application may be programmed using any appropriate programming language, such as Visual Basic®, Visual C®, Java®, Flash® media, etc. The native application may interact with the operating system of the computer system 108 through exposed application programming interfaces (APIs) to provide functionality such as saving the diagram file, loading the diagram file, uploading the diagram file to a server, receiving responses from the server, etc. as is known by those of ordinary skill in the art.

In some implementations, the diagramming application may be a web-based application made available through a browser running on the computer system 108. The web-based application may interact with one or more servers associated with the insurance provider to provide the templates and user interfaces of the FIGS. 7-13. The web-based application may employ JavaScript®, flash media, or other interactive mechanisms to enable drag-and-drop functionality of the symbols presented in the symbol presentation areas of the various templates. The web-based application may provide the user with an option to see the diagram either locally on the computer system 108, or to save it directly to a repository.

Figure 17:
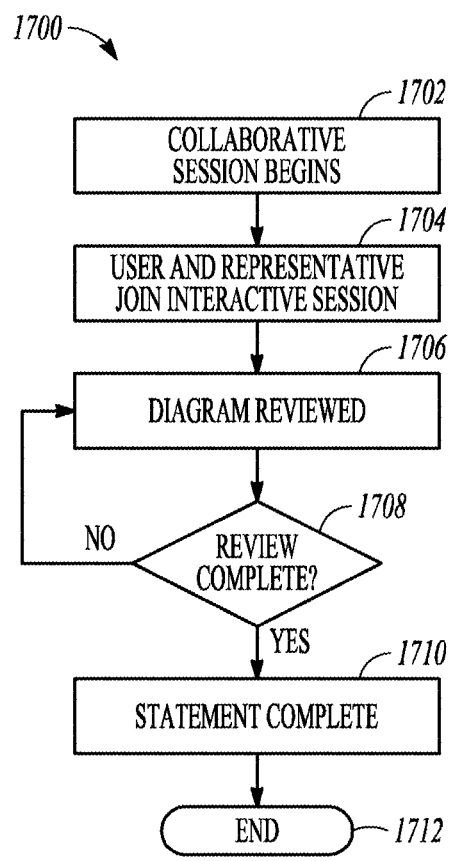
FIG. 17 illustrates an operational flowchart of a collaborative session between a user and a representative.

FIG. 17 illustrates an operational flowchart 1700 of a collaborative session between a user and a representative to review a diagram illustrating an accident scene. At 1702, a collaborative session begins between a user and a representative. For example, a user may contact the insurance provider to discuss a loss as a result of an accident. The user may have already uploaded a diagram of the accident scene to a repository, or may be contacting a representative to diagram the accident scene with the representative.

At 1704, the user and a representative joint an interactive session. For example, through a web-based application, as described above, the user and the representative may share a desktop of the computer system 108 to enable the user in the representative to jointly view a template, and to diagram the accident scene, if necessary. Such collaboration may be enabled through services such as WebEx.

At 1706, the user and the representative review the diagram. The diagram may be reviewed by the user and the representative to ensure its accuracy. This step may be performed to obtain certification from the user and the facts represented the diagram are true and accurate to the best of the user's knowledge.

At 1708, it is determined if the review is complete. If so, at 1710, the user statement is complete. An indication may be made in a repository to indicate that all information available to the user is now part of the record. If the review is not complete at 1708, then the review continues at 1706.

At 1712, the process ends. The user in the representative joint interactive session ends in the contacting the user and the insurance come a representative may be concluded.

Thus, as described above with regard to FIGS. 7-17, in various implementations a set of templates is provided such that the user (e.g., insured) may easily and accurately describe an accident scene by selecting an appropriate template and placing symbols representative of objects in the accident scene on the template. This aids in providing standardization of loss reports such that insurance companies are provided with consistent, standard symbology to represent and assess accidents. In addition, by standardizing the templates and symbols representative of objects in accident scenes, users are provided with an interface that is easy and intuitive, and that will communicate the appropriate information to their insurance company for processing of a loss due to an accident.

Hardware and Operating Environment

This section provides an overview of one example hardware and the operating environment in conjunction with which embodiments of the present disclosure may be implemented.

A software program may be launched from a non-transitory computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 18 below.

Figure 18:
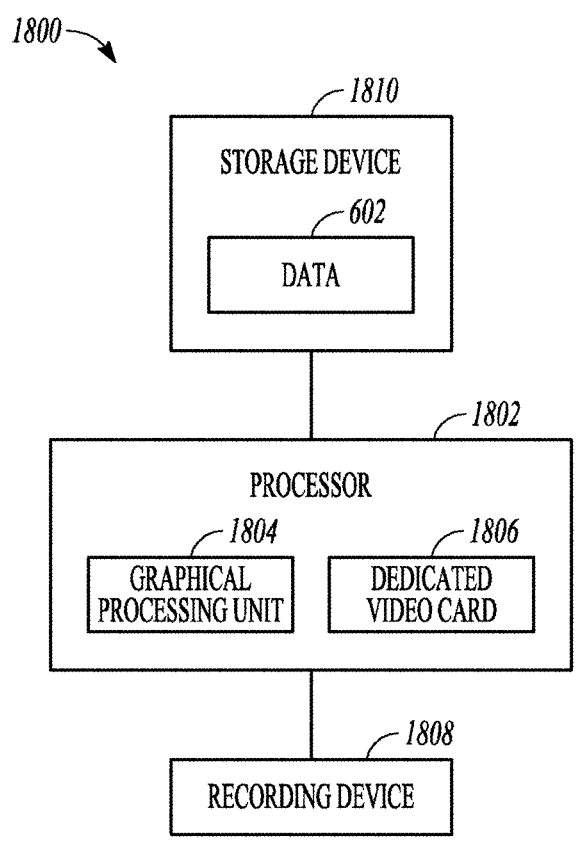
FIG. 18 is a block diagram illustrating an accident assessment and reconstruction computer system according to an example embodiment.

FIG. 18 is a block diagram of a computer system 1800 for accident reconstruction. The computer system 1800 comprises a processor 1802 and non-transitory computer executable instructions operative on a processor 1802. In one embodiment, the non-transitory computer executable instructions performed on a processor 1802 may include the executable instructions described in FIG. 6. In another embodiment, non-transitory computer executable instructions performed on a processor 1802 may include the executable instructions described in FIG. 5. In yet another embodiment, non-transitory computer executable instructions performed on a processor 1802 may include the executable instructions described in FIG. 4.

The computer system 1800 refers to a computer system for accident reconstruction. Alternatively, the computer system 1800 may also be used as a computer system for damage assessment of a vehicle following an accident. The computer system 1800 may be any programmable machine that receives input, stores and manipulates data, and provides output in a useful format. As noted previously, the computer system 1800 may be a mobile or handheld device operating on a processor such as the computer system 108 of FIG. 2.

The processor 1802 may be any electrical circuit that can execute computer instructions. A processor 1802 may be a microprocessor such as those used in microcomputers. The processor 1802 has the ability to perform the functions of the accident reconstruction application 110 (referenced in FIG. 1) and the damage assessment application 112 (also referenced in FIG. 1). The processor 1802 may be used to render visual image perspectives in two-dimensional or three-dimensional outputs. A processor 1802 may interact with a software rendering tool to create visual perspectives of an accident scene or a damage assessment of a vehicle. Refer to the description of FIG. 2 for additional detail pertaining to a software rendering tool. The processor 1802 may also have networking capabilities to allow the computer system 1800 to connect to the Internet.

In an alternative embodiment, the computer system 1800 may also contain a dedicated video card 1806. The dedicated video card 1806 may be attached to the processor 1802 of the computer system 1800. A dedicated video card 1806 is an expansion card which may be used to generate visual output to display. The dedicated video card 1806 may be used for accelerated rendering of two-dimensional graphics, three-dimensional scenes, video capture, and decoding among other things.

Alternatively, the computer system 1800 may also contain a graphics processing unit 1804. The graphics processing unit 1804 may be attached to the processor 1802 of the computer system 1800. A graphics processing unit 1804 is a specialized microprocessor which is used to offload and accelerate two-dimensional or three-dimensional graphics rendered from a microprocessor. The graphics processing unit 1804 may be used in any computer system including embedded systems, handheld or portable devices such as mobile phones, laptops, personal computers, workstations, and gaming consoles.

An alternative embodiment may further comprise a recording device 1808 linked to the processor 1802. A recording device 1808 may be any computer hardware having an electronic sensor used to capture still photos or moving images such as videos or movies. The recording device may be part of the external resource system 106 (referenced in FIG. 1). Accordingly, the recording device 1808 may communicate with the accident reconstruction application 110 (referenced in FIG. 1) and also the damage assessment application 112 (also referenced in FIG. 1) to capture data or information pertaining to an accident. The software applications may then integrate the captured data or information to render visual perspectives.

Yet another alternative embodiment may also comprise a storage device 1810 attached to the processor 1802. The storage device 1810 is attached to the processor 1802, and may contain associated information 602 (e.g., computer program instructions, data, or both) (as referenced in FIG. 6) which, when accessed, results in a machine (e.g., the processor(s) 1802) performing the activities previously described herein.

An alternate embodiment may further comprise a display device 1814 linked to the processor 1802. The display device 1814 may be used to display a visual perspective of an accident scene or vehicle damage assessment.

In an alternative embodiment, a computer system may be an apparatus for authenticating an electronic representation of an accident scene. The apparatus for authenticating an electronic representation of an accident scene comprises a means for creating an electronic representation of an accident scene, a means for simultaneously displaying the electronic representation of the accident scene to both an agent of an insurance company and an insurance policy holder, a means for editing the electronic representation of the accident scene by at least one agent of the insurance company and the insurance policy holder while the electronic representation of the accident scene is simultaneously displayed to both, and a means for receiving verification of the accuracy of the electronic representation of the accident scene.

The means for creating an electronic representation of an accident scene may be any computer system performing computer executable instructions such as the computer system 108 shown in FIG. 2 or the computer system described in FIG. 7.

The means for simultaneously displaying the electronic representation of the accident scene to both an agent of an insurance company and an insurance policy holder may be any computer system performing computer executable instructions such as the computer system 108 shown in FIG. 2 or the computer system described in FIG. 18. A display device 1814 linked to a processor 1802 may be used to simultaneously display the electronic representation.

The means for editing the electronic representation of the accident scene by at least one agent of the insurance company and the insurance policy holder while the electronic representation of the accident scene is simultaneously displayed to both may be any computer system performing computer executable instructions such as the computer system 108 shown in FIG. 2 or the computer system described in FIG. 18.

The means for receiving verification of the accuracy of the electronic representation of the accident scene may be any computer system performing computer executable instructions such as the computer system 108 shown in FIG. 2 or the computer system described in FIG. 18.

Alternatively, the apparatus for authenticating an electronic representation of an accident scene may further comprise means for creating a loss report including the electronic representation of the accident scene. The means for creating a loss report including the electronic representation of the accident scene may be any computer system with a processor such as the computer system 108 shown in FIG. 2 or the computer system described in FIG. 18.

Moreover, the apparatus for authenticating an electronic representation of an accident scene may further comprise means for creating an accident report including the electronic representation of the accident scene. The means for creating an accident report including the electronic representation of the accident scene may be any computer system with a processor such as the computer system 108 shown in FIG. 2 or the computer system described in FIG. 18.

This has been a detailed description of some exemplary embodiments of the present disclosure contained within the disclosed subject matter. The detailed description refers to the accompanying drawings that form a part hereof and which show by way of illustration, but not of limitation, some specific embodiments of the present disclosure, including a preferred embodiment. These embodiments are described in sufficient detail to enable those of ordinary skill in the art to understand and implement the present disclosure. Other embodiments may be utilized and changes may be made without departing from the scope of the present disclosure.

Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the present disclosure lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this disclosure may be made without departing from the principles and scope as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A non-transitory computer readable medium storing computer executable instructions that when executed on a computer, cause the computer to effectuate operations comprising:
   receiving, by a processor of the computer, location-specific information for an accident scene, wherein the location-specific information comprises an image of a roadway;
   receiving, by the processor, map information that includes the accident scene;
   creating, by the processor, a base image for a representation of the accident scene using the map information and the location-specific information;
   augmenting, by the processor, the base image based on traffic information;
   causing, by the processor, the base image to be transmitted to a party involved in an accident that occurred at the accident scene; and
   receiving, by the processor, an indication from the party that the base image is accurate.

2. The non-transitory computer readable medium of claim 1, wherein the location-specific information further comprises an image of a landscape.

3. The non-transitory computer readable medium of claim 1, wherein the location-specific information further comprises weather data.

4. The non-transitory computer readable medium of claim 1, further comprising instructions to annotate a perspective of the accident scene using voice.

5. The non-transitory computer readable medium of claim 1, wherein the instructions to record further comprise instructions to receive data representing a change in position of a symbol when a user drags the symbol from start to end.

6. The non-transitory computer readable medium of claim 1, the operations further comprising:
   adding, by the processor, at least one symbol to the base image to create a representation of the accident scene;
   recording, by the processor, movement of the at least one symbol representing a vehicle in the accident scene; and
   rendering, by the processor, a perspective of the accident scene including the base image, the at least one symbol and the movement.

7. A computer system, comprising:
   a processor; and
   memory coupled with the processor, the memory storing executable instructions that when executed by the processor cause the processor to effectuate operations comprising:
      receiving data from a recording device, the data representative of a vehicle's movement;
      receiving location-specific information for an accident scene, wherein the location-specific information comprises an image of a roadway;
      receiving map information that includes the accident scene;
      creating a reconstructed accident scene, based on the data representative of the vehicle's movement, the map information, and the location-specific information;
      augmenting the reconstructed accident scene based on traffic information;
      causing the base image to be transmitted to a party involved in an accident that occurred at the accident scene; and
      receiving an indication from the party that the base image is accurate.

8. The computer system of claim 7, the operations further comprising integrating the reconstructed accident scene with an insurance loss report.

9. The computer system of claim 7, the operations further comprising integrating the reconstructed accident scene with a police report.

10. The computer system of claim 7, wherein the computer system further comprises a recording device.

11. The computer system used of claim 7, wherein the computer system is a mobile device.

12. The computer system of claim 7, further comprising a graphics processing unit to enable offloading of three-dimensional graphics converted by the processor.

13. The computer system of claim 7, further comprising a graphics processing unit to enable offloading of three-dimensional graphics converted by the processor.

* * * * *